United States Patent [19]

Kondo

[11] 4,359,268
[45] Nov. 16, 1982

[54] LIGHT QUANTITY CONTROL APPARATUS

[75] Inventor: Michikazu Kondo, Tokyo, Japan

[73] Assignee: Nippon Electric Co., Ltd., Tokyo, Japan

[21] Appl. No.: 132,481

[22] Filed: Mar. 19, 1980

[30] Foreign Application Priority Data

Mar. 9, 1979 [JP] Japan ................................. 54-27789
Mar. 12, 1979 [JP] Japan ................................. 54-28441

[51] Int. Cl.³ .......................... G02F 1/03; G02F 1/29; G02F 1/09
[52] U.S. Cl. .................................... 350/377; 350/381; 350/383; 350/401
[58] Field of Search ............................... 350/382–383, 350/385, 172, 380, 388, 377, 407, 401, 403, DIG. 2, 381

[56] References Cited

U.S. PATENT DOCUMENTS

| | | | |
|---|---|---|---|
| 3,243,724 | 3/1966 | Vullsteke | 350/DIG. 2 |
| 3,329,474 | 7/1967 | Harris et al. | 350/DIG. 2 |
| 3,430,048 | 2/1969 | Rubinstein | 350/401 |
| 3,719,414 | 3/1973 | Wentz | 350/403 |

OTHER PUBLICATIONS

Ammann, E. O., "Modification of Devices Normally Operating Between Input & Output Polarizers to Allow Their Use with Arbitrarily Polarized Light", Jr. Optical Soc. America, 4/65, pp. 412–417.

Nelson, J. J., "Digital Light Deflection", Bell System Tech. Jr., 5/64, pp. 821–845.

Matsumoto, T., "Investigation of a Minute Light Circuit Utilizing Birefringence Characteristic", presented meeting of Soc. of Japanese Electronic Communication, Published 9-11-78.

Kondo et al., "Phase-Matched Electro-Optic Light Modulator", Proc. 9th Conf. on Solid State Devices, Japanese Jr. of App. Physics, vol. 17, 1978, Supp. 17-1, pp. 107–112.

Primary Examiner—William H. Punter
Attorney, Agent, or Firm—Townsend and Townsend

[57] ABSTRACT

First, second and third double refractive elements are aligned along a Y axis. A polarization converter is disposed between the first and second elements for polarizing two light component, produced by the first element and a reflection mirror is disposed between the second and third element for deflecting a first output light of the second element. The second birefringence element operates to separate two light components converted by the polarization converter into converted light and not converted light and to synthesize one of the separated light component to produce a first output light and to convert remaining light component into second and third output light. The third birefringence element operates to synthesize the second and third lights supplied from the second element to form a single output light thereby controlling quantity of light produced by the third element by the polarization converter.

2 Claims, 6 Drawing Figures

LIGHT QUANTITY CONTROL APPARATUS

BACKGROUND OF THE INVENTION

This invention relates to a light quantity control apparatus, more particularly apparatus for controlling the quantity of light to be transmitted in an optical communication system.

With recent improvement of the performances of optical fibers and semiconductor laser devices, optical communication systems have progressively been used in the field of practical applications.

In such an optical communication system it is not only necessary to transmit light without attenuation but also to modulate the quantity of light, or to branch the light into two portions or to switch light among different light paths.

According to a prior art light quantity control apparatus one or two birefringence elements are combined with a light modulator to control the ratio of output light to the incident light to the control apparatus. A combination of one birefringence element and one light modulator is disclosed in a J. J. Nelson's paper entitled "Digital Light Deflection", "The Bell System Technical Journal", May, 1964 Vol. XLIII No. 3, pages 821–845 and an example of a light control apparatus including two spaced apart birefringence elements and light modulator interposed therebetween is disclosed in a Takao Matsumoto's paper entitled "Investigation of a Minute Light Circuit Utilizing Birefringence Characteristic" presented before a meeting of the Society of Japanese Electronic communication and published on Sept. 11, 1978.

In the former, however, the incident light must be linear polarized light, whereas in the latter, although it is possible to effect light control, such as branching, without relying upon polarized incident light, the output of the second birefringence element comprises first incident light consisting of either light subjected to a polarization conversion by the light modulator or light not subjected to the polarization conversion, and second and third output light waves independently produced in response to two input light waves and different from the first output light.

As above described, usually one light wave is separated into two components applied along different light paths, or light is selectively applied to different light wave paths, or the quantity of one light is controlled. For this reason, with the prior art control device disclosed in the latter paper, the first output light wave is combined with either one of the second and third output light waves so that either one of the second and third output light waves should be discarded. The same is true when either one of the second and third light waves is selected to control the quantity of light.

SUMMARY OF THE INVENTION

Accordingly, it is the principal object of this invention to provide light quantity control apparatus having a small insertion loss and which does not rely on the polarized state of the incident light.

Another object of this invention is to provide a novel light quantity control apparatus capable of controlling light quantity at a high speed without relying upon the polarized state of the incident light.

Still another object of this invention is to provide a novel light quantity control apparatus suitable for branching one incident light wave into at least two output light waves.

A further object of this invention is to provide an improved light quantity control apparatus capable of increasing the light extinction ratio between light paths when one incident light wave is branched into at least two output light wave.

Still further object of this invention is to provide a light quantity control apparatus capable of increasing the light extinction ratio to a value extremely close to 100:1.

According to this invention these and another objects can be accomplished by providing a light quantity control apparatus comprising first, second and third birefringence elements having substantially parallel incident planes and emitting planes and aligned along an axis, the first birefringence element dividing incident light into two components, a polarization converter disposed between the first and second birefringence elements for converting the polarization of the two light components and sending the same to the second birefringence element, the second birefringence element separating the polarized two light components into light converted by the polarization converter and light not converted, and the second birefringence element operating to combine one of the separated light waves to emit a first output light wave and to emit the other one of the separated light waves as second and third output light waves, and means disposed between the second and third birefringence elements for changing the direction of the first output light wave emitted by the second birefringence element, the third birefringence element operating to combine the second and the third light waves supplied from the second birefringence element so as to emit one output light wave, thereby controlling the quantity of light derived out from the third birefringence element by the polarization converter.

DESCRIPTION OF THE PREFERRED EMBODIMENTS

Figure 1:
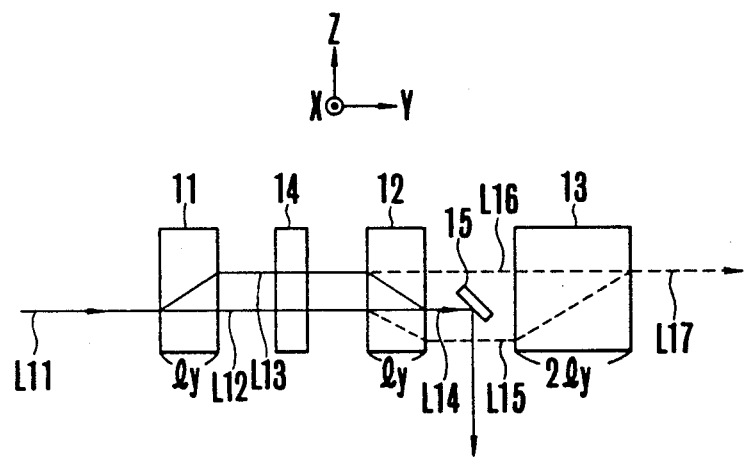
FIG. 1 is a schematic representation showing one embodiment of the light quantity control apparatus according to this invention.

The light quantity control apparatus shown in FIG. 1 comprises calcite ($Ca\ CO_3$) elements 11, 12 and 13 having a birefringence characteristic and which are sequentially arranged in the direction of light transmission, i.e., in the direction of the Y axis. Each of these calcite elements 11, 12 and 13 is constructed such that its optical axis does not coincide with the Y axis or the Z axis in a Y–Z plane and such that its incident surface and the output or emitting surface are parallel with an X–Z plane which is perpendicular to the Y axis.

Figure 2:
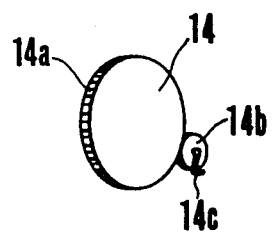

The calcite elements 11, 12 utilized in this embodiment have the same width $l_y$ when measured along the Y axis and have their optical axes symmetrical with respect to the Z axis. The calcite element 13 has an optical axis extending in the same direction as that of the calcite element 11 and a width twice ($2l_y$) that of the calcite element 11 when measured in the direction of the Y axis. A half wavelength plate 14 acting as a polarization converter is disposed between the calcite elements 11 and 12. The half wavelength plate 14 takes the form of a circular disc, for example, as shown in FIG. 2, and a gear 14a formed about the periphery of the circular disc 14 is meshed with a pinion 14b, so that by manually rotating the pinion 14b with a handle 14c the half wavelength plate 14 can be rotated so as to effect any desired polarization conversion. Between the calcite elements 12 and 13 is disposed a small mirror 15 for changing the light path. In this example, the mirror 15 is disposed to deflect light to the outside of the light quantity control apparatus.

The control apparatus operates as follows: Suppose now that the optical axis of the half wavelength plate 14 coincides with the X or Z axis. When incident light $L_{11}$ impinges upon one side surface of the calcite element 11, it is separated into linear polarized light $L_{12}$ in the direction of X and linear polarized light $L_{13}$ in the direction of Z. Both linear polarized light waves $L_{12}$ and $L_{13}$ emitting from the calcite element 11 are parallel with the Y axis. The spacing between the linear polarized light waves $L_{12}$ and $L_{13}$ varies depending upon the direction of the optical axis of the calcite element 11 and is proportional to the width thereof in the direction of Y. The aforementioned two parallel light waves $L_{12}$ and $L_{13}$ maintain their polarized state after transmitting through the half wavelength plate 14, and are then combined by the calcite element 12 to form a light wave $L_{14}$ having the same polarization state as the incident light $L_{11}$. The light path of the light wave $L_{14}$ is deflected by the mirror 15.

Suppose now that the optical axis of the half wavelength plate 14 makes an angle of 45° with respect to Z axis. Under these conditions, although the incident light $L_{11}$ is separated into the linear polarization light $L_{13}$ in the direction of Z and the linear polarization light $L_{12}$ in the direction of X by the calcite element 11 in the same manner as above described, these light waves are converted into orthogonal linear polarized light waves by the half wavelength plate 14. More particularly, when transmitting through the half wavelength plate 14, the linear polarized light $L_{13}$ in the direction Z is converted into linear polarized light in the direction of X, while the linear polarized light $L_{12}$ in the direction of X converted into linear polarized light in the direction of Z. The spacing between linear polarized light waves $L_{12}$ and $L_{13}$ transmitting through the half wavelength plate 14 is doubled by the calcite element 12. The linear polarized light $L_{16}$ in the direction of X and the linear polarized light $L_{15}$ in the direction of Z pass by both sides of mirror 15 and are thereafter combined by the calcite element 13 to form an output light wave $L_{17}$. At this time the light wave $L_{14}$ is not present.

When the major axis of the half wavelength plate 14 makes an angle $\theta$ (0° < $\theta$ < 45°) with respect to the Z axis a portion of the incident light forms the light wave $L_{14}$ and the remaining portion forms the light wave $L_{17}$. Thus, in this embodiment, when the half wavelength plate 14 is rotated by suitable means, for example by hand, the ratio of the light quantities of the light waves $L_{14}$ and $L_{17}$, that is the ratio of branching, can be varied. Theoretically, with the construction described above, there is no loss of light energy irrespective of the state of polarization of the incident light $L_{11}$.

With the construction described above, elements 11, 12, 13 and 14 through which light is transmitted do not cause any appreciable energy loss. For this reasin it is possible to construct a light quantity control apparatus having a small insertion loss regardless of the state of polarization of the incident light. Further, with the light quantity control apparatus described above, it is possible to adjust the ratio between the quantities of the light waves ($L_{15}+L_{16}$) and $L_{14}$, or $L_{14}$ and $L_{15}$ or $L_{16}$ as well as the ratio between the light quantities of the light waves $L_{14}$ and $L_{17}$ by adjusting the polarization converter 14.

In addition, in the light quantity control apparatus described above since only one polarized light converter is used as a means for polarizing light waves separated by the calcite element 11, the construction as a whole becomes simple and the branched light waves can be polarized simultaneously and with a predetermined relationship with a single operation. In addition, according to the present invention, the light waves emitted from the second birefringence element are combined by the third birefringence element to obtain one output light wave. As a consequence, as it is possible to derive out two light waves, one subjected to the polarization conversion by the action of the polarization converter 14 and the other not subjected to the polarization conversion there is no loss of light. This is a substantial improvement over the prior art apparatus described alone in which only one of two light waves having the same characteristic is used.

In the illustrated embodiment, the deflection mirror 15 may be replaced by optical fibers. More particularly, when a small lens and the ends of the optical fibers are disposed at the position of mirror 15 shown in FIG. 1, it is possible to deflect the light path of the light wave $L_{14}$.

In this invention, where a light modulator utilizing an electro-optic effect is used as the polarization converter, there is provided a light quantity control device, that is an active light branching circuit capable of controlling the branching ratio at a high speed.

Figure 3:
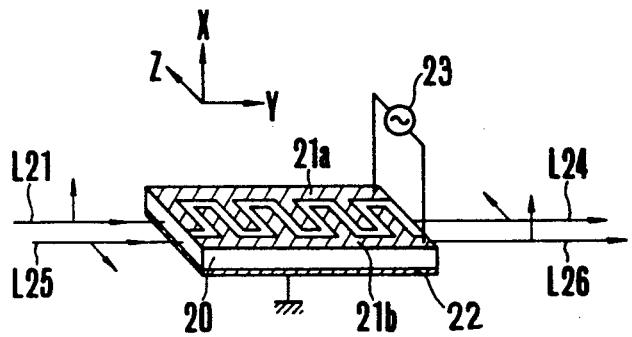

FIG. 3 illustrates one example of a suitable light modulator. The electro-optic light modulator shown therein utilizes a crystal 20 of lithium tantalate (Li Ta O$_3$) which is cut in parallel with the Y-Z plane and formed to transmit light in the direction of Y axis. Interdigital electrodes 21a and 21b are disposed on the upper surface of the crystal 20, whereas a grounded electrode 22 is applied onto the lower surface. A voltage is impressed across electrodes 21a and 21b from a signal generator 23 so as to generate a spatially periodic electric field in the direction of transmission of the light. Consequently, the incident linear polarized light is converted into two polarized light waves having orthogonal planes of polarization. For example, incident light $L_{21}$ polarized in the direction of the X axis which impinges upon the crystal 20 of lithium tantalate would be converted into output light wave $L_{24}$ polarized in the direction of the Z axis when voltage is impressed across the interdigital electrodes 21a and 21b on the crystal from the signal generator 23. The degree of conversion is determined by the magnitude of the applied voltage. Thus, for example, when a voltage of about 30 V is applied across electrodes 21a and 21b on a crystal having a length of 20 mm in the direction of transmission of light and a thickness of 300 microns and under a temperature control, the above described polarization conversion takes place.

As a result of application of the voltage, the incident light polarized in the direction of Z axis would be converted into the output light $L_{26}$ polarized in the direction of X axis.

Use of such a lithium tantalate crystal is disclosed for example, in a paper entitled "Phase-Matched Electro-Optic Light Modulator" pages 107–112, reprinted from "Proceedings of the 9th Conference on Solid State Devices", Tokyo, 1977, Japanese Journal of Applied Physics, Vol. 17 (1978). Supplement 17-1, pages 107–112.

As the light modulator may be used an electro-optic light modulator may be employed, the modulator including a lithium tantalate crystal and means for applying a spatially constant electric field thereacross in a direction perpendicular to the z axis, the crystal being adapted to transmit light in the direction of the X or Y axis and having a composition of Li/Ta>1, and a difference between the refractive index for normal light and that for abnormal light being less than $10^{-4}$, preferably substantially zero at any portion of the crystal.

The use of either one of the two electro-optic light modulators described above enables high speed switching of the branching ratio under an electrical control provided by the signal generator. Especially, an active light branching circuit is provided capable of satisfactorily switching light between two light paths by suitably selecting the voltage.

Such an electro-optic light modulator is characterized in that it can be driven with small amounts of electric power, and when used as the light quantity control apparatus of this invention it would operate stably with a high extinction ratio.

Another light modulator capable of electrically rotating the plane of polarization of the incident light by 90° can also be used as the polarization converter of this invention. One example of such converter is illustrated in FIG. 4.

Figure 4:
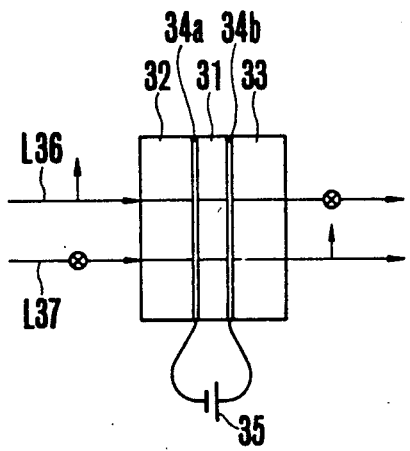
FIGS. 2, 3, 4 and 5 show some examples of the polarization converter shown in FIG. 1.

The light modulator shown in FIG. 4 utilizes a nematic liquid crystal 31, which as is well known in the art has a property of changing the orientation of the molecules when subjected to an electric field, thereby rotating the plane of polarization of the incident light. Usually, the liquid crystal 31 is filled in a space defined by spacers, not shown, disposed on spaced apart glass substrates 32 and 33, and voltage is applied from a source 35 across transparent electrodes 32 and 33 respectively applied onto the inner surfaces of the substrates 32 and 33. Various types of nematic liquid crystals are well known. For example, a biphenyl family dielectrically positive nematic liquid crystal E7 sold by PDH Chemical Corp. may be used. When two polarized light waves $L_{36}$ and $L_{37}$ having orthogonal polarization planes are inputted to the polarization converter shown in FIG. 4, the state of polarization would be varied depending upon the voltage impressed across the liquid crystal 31.

This polarization converter utilizing the liquid crystal is also a low power drive type so that it is possible to effect desired light quantity control as well as branching ratio control.

Figure 5:
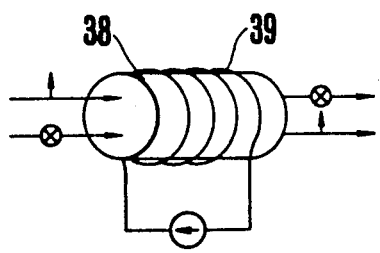

As a light modulator having the same polarization characteristic as a liquid crystal may be mentioned a light modulator utilizing a magneto-optic effect. For example, as shown in FIG. 5, a coil 39 is wound about a crystal 38 of YIG and when current is passed through the coil, the light transmitting through the YIG crystal would be subjected to Faraday effect caused by the magnetic field thereby rotating the plane of polarization.

Figure 6:
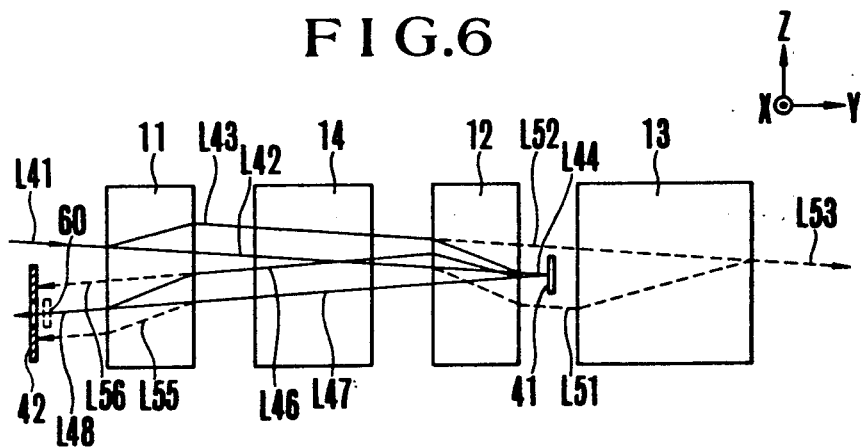
FIG. 6 is a diagrammatic representation showing another embodiment of the light quantity control apparatus according to this invention.

FIG. 6 illustrates still another embodiment of the light quantity control apparatus according to this invention, in which elements corresponding to those shown in FIG. 1 are designated by the same reference characters. In FIG. 6 calcite elements 11, 12 and 13 are aligned along one axis (in this embodiment, the Y axis) and between the calcite elements 11 and 12 is disposed a polarization converter 14 comprising the light modulator shown in FIG. 3. Furthermore, in this embodiment, a mirror 41 substantially parallel with the Z axis is disposed between the calcite elements 12 and 13. A pin hole member 42 acting as two light absorbers is disposed on the side of the first calcite element 11 upon which the incident light impinges. In this embodiment, the incident light $L_{41}$ is inputted to the calcite element 11 with a slight inclination with respect to the direction of Y. In the same manner as in the previous embodiment the light incident upon the calcite element 11 is divided into two light waves $L_{42}$ and $L_{43}$ which transmit through the light modulator 14 and are combined again by the calcite element 12 when voltage is not impressed upon the light modulator 14.

Actually, when the direction of the incident light $L_{41}$ deviates from the direction of Y the beam diameter of the synthesized light wave $L_{44}$ would be increased slightly, but so long as the angle between the incident light $L_{41}$ and the Y axis is less than 10°, the degree of increase in the beam diameter is very small. The synthesized light wave $L_{44}$ is reflected back by a reflection mirror 41 toward the calcite element 12 to be separated into a polarized wave $L_{46}$ in the direction of Z and a polarized wave $L_{47}$ in the direction of X. These two polarized waves enter again into the light modulator 14 and are thereafter recombined by the calcite element 11 to produce output light $L_{48}$. The pin hole member 42 is constructed to transmit the output light $L_{48}$.

In this embodiment, when applied with voltage, the light modulator 14 converts about 95% of the incident light into two orthogonal polarized light components. These converted light components $L_{51}$ and $L_{52}$ transmit through the calcite element 12 pass by both sides of the reflecting mirror 41, and are thereafter synthesized by the calcite element 13 to form light wave $L_{53}$. The remaining 5% of the polarized light component not converted is combined by the calcite element 12 and then reflected by mirror 41. The reflected light is separated by the calcite element 12 into the polarized light wave $L_{47}$ in the direction of X and the polarized light wave $L_{46}$ in the direction of X and these polarized light waves enter again into the light modulator 14. 95% of the original 5% is converted by the light modulator 14 into orthogonal polarized light components which are separated by the calcite element 11 to form light waves $L_{55}$ and $L_{56}$. However, these light waves are intercepted by the pin hole member 42, and 5% of the light wave of the remaining 5%, i.e., only 0.25% of the original light is combined by the calcite element 11 and transmitted through the pin hole member.

More particularly, where the same light modulator is used, as in the embodiment shown in FIG. 2, the extinction ratio is 100:5; whereas in this embodiment the extinction ratio is improved to 100:0.25.

As above described, this embodiment gives a high extinction ratio even when voltage is applied. Where another light modulator having a conversion efficiency of less than 100% is substituted for the light modulator utilized in this embodiment, a high extinction ratio can be assured with the same construction. Instead of reflecting the light only once, where an additional mirror 60 shown by broken lines in FIG. 6 is provided on the incident side of the calcite element 11, the light reflected by the mirror 60 again transmits through calcite element 11, light modulator 14, and calcite element 12 and is emitted thereby as output light. In this manner, by reflecting the light many times and causing it to transmit through the light modulator many times, still higher extinction ration can be obtained.

It should be understood that the invention is not limited to the specific embodiments described above so that many changes and modifications may be made without departing the spirit and scope of the invention as defined in the appended claims. For example, the calcite element utilized in the illustrated embodiments can be replaced by a rutile crystal, quartz, potassium dihydrogen phosphate (KDP), sodium nitrate (Na NO$_3$) and like other substances having birefringence properties. Where the same birefringence substance is used for the first to third birefringence elements, the design thereof can be simplified. However, if desired, combinations of different double refractive substances may be used.

What is claimed is:

1. Light quantity control apparatus comprising first, second and third birefringence elements having substantially parallel incident planes and emitting planes and aligned along an axis; said first birefringence element dividing incident light into two light components;
    a polarization converter disposed between said first and second birefringence elements for polarizing said two light components and sending the same to the second birefringence element;
    said second birefringence element separating said polarized two light components into light converted by said polarization converter and light not converted and said second birefringence element operating to synthesize first output light waves and to emit the other one of the separated light waves as second and third output light waves,
    means disposed between said second and third birefringence elements for changing direction of the first output light wave emitted by said second birefringence element, said direction changing means comprising a mirror for reflecting said first output light back to said second birefringence element;
    said third birefringence element operating to synthesize the second and the third light waves supplied from said second birefringence element so as to emit one output light wave, thereby controlling quantity of light derived out from said third birefringence element by said polarization converter, said apparatus further comprising means installed on the incident face of said first birefringence element, and wherein the light reflected by said mirror is divided into two light components by said second birefringence element and then synthesized by said first birefringence element after transmitting through said polarization converter, said means operating to derive out only the synthesized light.

2. Light quantity control apparatus comprising first, second and third birefringence elements having substantially parallel incident planes and emitting planes and aligned along an axis; said first birefringence element dividing incident light into two light components;
    a polarization converter disposed between said first and second birefringence elements for polarizing said two light components and sending the same to the second birefringence element;
    said second birefringence element separating said polarized two light components into light converted by said polarization converter and light not converted and said second birefringence element operating to synthesize first output light waves and to emit the other one of the separated light waves as second and third output light waves,
    means disposed between said second and third birefringence elements for changing direction of the first output light wave emitted by said second birefringence element, said direction changing means comprising a mirror for reflecting said first output light back to said second birefringence element;
    said third birefringence element operating to synthesize the second and the third light waves supplied from said second birefringence element so as to emit one output light wave, thereby controlling quantity of light derived out from said third birefringence element by said polarization converter, said apparatus further comprising another mirror disposed on an incident face of said first birefringence element, and wherein the light reflected by said first mentioned mirror is separated into two light components by said second birefringence element and then synthesized by said first birefringence element after transmitting through said first birefringence element, said another mirror reflecting the synthesized light components back to said first birefringence element.

* * * * *